US 6,643,355 B1

(12) United States Patent
Tsumpes (10) Patent No.: US 6,643,355 B1
(45) Date of Patent: *Nov. 4, 2003

(54) AUTOMATED PARALLEL AND REDUNDANT SUBSCRIBER CONTACT AND EVENT NOTIFICATION SYSTEM

(76) Inventor: William J. Tsumpes, 7025 Alamitos Ave., San Diego, CA (US) 92154

( * ) Notice: Subject to any disclaimer, the term of this patent is extended or adjusted under 35 U.S.C. 154(b) by 0 days.

This patent is subject to a terminal disclaimer.

(21) Appl. No.: 10/227,752

(22) Filed: Aug. 26, 2002

Related U.S. Application Data

(63) Continuation of application No. 09/617,872, filed on Jul. 17, 2000, now Pat. No. 6,442,241.
(60) Provisional application No. 60/143,979, filed on Jul. 15, 1999.

(51) Int. Cl.[7] .............................................. H04M 11/04
(52) U.S. Cl. ......................................... 379/45; 379/37
(58) Field of Search ......................... 379/37–51, 127.01

(56) References Cited

U.S. PATENT DOCUMENTS

| 5,805,670 A | 9/1998 | Pons et al. |
| 6,295,346 B1 | 9/2001 | Markowitz et al. |
| 6,442,241 B1 * | 8/2002 | Tsumpes ...................... 379/45 |

* cited by examiner

Primary Examiner—Wing Fu Chan
(74) Attorney, Agent, or Firm—Kenneth A. Roddy (57) ABSTRACT

An automated parallel and redundant subscriber contact and event notification system capable of being triggered by the change in status of any sensing device or process including the sensor of an alarm system or other event. The system enables automated simultaneous contact of one or more persons over a plurality of telephonic and electronic communication channels and provides parallel event-specific notification via voice, pager, voice mail, fax and email to the recipient(s) that are identified by electronic or speech recognized entry of a PIN and then provides them with a detailed message including the date and time of a specific event which has occurred with respect to a monitored sensor. A telephone switching or conferencing feature allows the recipient(s) to communicate directly with a predetermined or pre-programmed location or person or select from a menu based upon the type of event that has occurred and the pre-programmed selection list. The system may be custom programmed by the authorized subscriber via a telephone interactive voice response system or Internet web page that offers specific programming, reporting, contact numbers, and message options. The system may also be triggered or programmed to perform its notification based upon the failure to receive a anticipated input, input of a timer, pre-programmed to operate at a specific time, or triggered by another CPU.

34 Claims, 4 Drawing Sheets

AUTOMATED PARALLEL AND REDUNDANT SUBSCRIBER CONTACT AND EVENT NOTIFICATION SYSTEM

CROSS REFERENCE TO RELATED APPLICATION

This is a continuation of application Ser. No. 09/617,872, filed Jul. 17, 2000, now U. S. Pat. No. 6,442,241 and priority thereof is claimed.

BACKGROUND OF THE INVENTION

1. Field of the Invention

This invention relates generally to alarm and event notification methods and systems, and more particularly to an automated parallel and redundant subscriber contact and event notification system and method that enables automated simultaneous contact and notification of one or more authorized persons over a plurality of telephonic and electronic communications channels including wireless, voice, pager, voice mail, fax and email to provide specific event information relative to one or more monitored (inputs), sensors or alarms.

2. Brief Description of the Prior Art

Conventional security systems that alert building occupants and law enforcement and emergency authorities based upon a security violation occurring at the secured premises typically are usually interconnected to a central monitoring station service system via a telecommunications line, such as a publicly switched telephone network (PSTN). Many alarm systems are in remote communication with a central monitoring station service via a wireless or RF communication network.

Typically, the security or alarm system includes sensors deployed at strategic locations throughout the premises or on the vehicle being monitored to detect a change in status of the sensor. For example in a business or residence, sensors may be located in doorways, windows and other ports of entry and motion sensors may also be placed strategically within the building to detect movement while carefully positioned smoke and heat sensors detect the presence of fire. Vehicle alarm sensors may be positioned to detect motion, glass breakage, and changes in the electrical or ignition system, etc.

The sensors are connected with a central controller which is interconnected by wireless or wireline connections to a central monitoring station service which is maintained by a security service provider that continuously monitors all activated security systems for sensor breaches. Responsive to receiving a breach signal, the controller issues an audible alarm to the occupants if present at the time and originates a call to the central monitoring station. Upon receiving the breach signal from the security system, the central monitoring station determines the type of breach, and a person at the central monitoring station retrieves the subscribers contact numbers usually consisting of the premises telephone number and the subscribers residence telephone number and attempts to manually telephone and notify the occupants or owners or other authorities of the breach or emergency situation.

During this process, the person or staff at the central monitoring station will view the stored telephone numbers and attempt to place calls to the systems subscriber at those numbers to tell them of the current security event and attempt to determine if the event is a valid security breach or possibly just a false alarm condition. It is time consuming for the central monitoring station to access and dial these stored numbers and difficult for the subscriber to change the stored information, and the contact numbers frequently become obsolete and out of date and useless during an actual security breach.

Usually, these calls to notify the subscriber are made by just one employee who is responsible for processing the event. The employee must determine the manner in which to handle the call and the person that needs to be notified. The subscriber has no direct control over the proper handling of the event or any assurance that the employee will handle the event in the most expedient and beneficial manner. Thus on many occasions, due to the manual nature of processing these calls, one at a time, vital minutes lapse between when the actual breach or emergency occurs and the subscribers and/or emergency authorities are actually notified, if ever. These delays and uncertain processing methods frequently compromise the effectiveness of the security system and render the monitoring service less effective and efficient than what could have been had the notification process been more timely. In some cases a telecommunication line may be severed or down caused by tampering or failure so that a breach signal from the security system will not be sent to the central monitoring station and the central monitoring service is unaware of an alarm situation.

Thus, there is a long-felt need in the security and alarm notification industry for a more efficient and effective system and method for alerting subscribers and authorities when a security breach or other specific event occurs to insure that the conditions of the event are properly handled the most calculated, preplanned, expeditious and secure manner.

This need is addressed and a technological advance is achieved by the present automated parallel and redundant subscriber contact and event notification system and method which is distinguished over the prior art in general by an automated parallel and redundant subscriber contact and notification system capable of being triggered by the change in status of any sensing device or process including the sensor of an alarm system or other event. The system enables automated simultaneous contact of one or more persons over a plurality of telephonic and electronic communication channels and provides parallel event-specific notification via voice, pager, voice mail, fax and email to the recipient(s) that are identified by electronic or speech recognized entry of a PIN and then provides them with a detailed message including the date and time of a specific event which has occurred or failed to occur with respect to a monitored sensor. A telephone switching or conferencing feature allows the recipient(s) to communicate directly with a predetermined or pre-programmed location or person or select from a menu based upon the type of event that has occurred and the pre-programmed selection list. The system may be custom programmed by the authorized subscriber via a telephone interactive voice response system or Internet web page that offers specific programming, reporting, contact numbers, and message options. The system may also be triggered or programmed to perform its notification based upon the input of a timer, pre-programmed to operate at a specific time, pre-programmed to operate upon failure of an input, trigger or event to happen, or triggered by another CPU.

SUMMARY OF THE INVENTION

It is therefore an object of the present invention to provide an automated parallel and redundant subscriber contact and event notification system which replaces and compliments the existing systems in use in a central monitoring station or may be configured and operated in manner to automatically provide the services of an central monitoring station.

It is another object of this invention to provide an automated parallel and redundant subscriber contact and event notification system which will allow the system subscriber himself to preprogram and control the operations of the systems and to control the manner in which he wished to receive the event specific notification services including the desired communications channels, hours of operation, vacation scheduling and the pre-programmed responses which the system will take in response to many an unlimited different types of events.

Another object of this invention is to provide an automated parallel and redundant subscriber contact and event notification system which allows secure internet access for the subscribers personal contact information and programming and reporting of system events, histories and setup from anywhere there is internet access allowing the subscriber to maintain accurate and predetermined processing of the event occurrences on the subscribers system.

Another object of this invention is to provide an automated parallel and redundant subscriber contact and event notification system which provides its services from parallel and redundant multiple locations to insure that in the event that one specific location should be rendered inoperable or inaccessible to communications channels that it's services will still be performed by a backup or redundant master central monitoring and notification center or Network Operating Center, (NOC) providing a higher level of secure operations than just a single central monitoring station could provide.

Another object of this invention is to provide an automated parallel and redundant subscriber contact and event notification system which may be configured to provide event notification services for use in any application for the automated reporting of any information including process notification such as the shutdown of an oil well pump, failure of a fluids valve, opening of a warehouse entrance, the accumulation of a certain level of material, the arrival of shipment or delivery, a high water level in the hull of a marine vessel, or the tampering of a communications line, or the theft of a motor vehicle or a vandalism or break-in at a remotely stored storage container or tool shed.

A further object of this invention is to provide an automated parallel and redundant subscriber contact and event notification system which allows a single master monitoring and notification center or Network Operations Center, (NOC), to provide the subscriber notification services for an unlimited number of remote central monitoring stations, or subscriber facilities.

A still further object of this invention is to provide an automated parallel and redundant subscriber contact and event notification system which supplements or replaces the current systems in use in an alarm central monitoring and is also capable of providing backup alarm signal delivery to a central monitoring station of an alarm event over a backup communications channel such as a wireless radio transceiver to insure that the alarm signal actually reaches the alarm central monitoring station.

Other objects of the invention will become apparent from time to time throughout the specification and claims as hereinafter related.

The above noted objects and other objects of the invention are accomplished by the present automated parallel and redundant subscriber contact and notification system and method which is capable of being triggered by the change in status of any sensing device, or the failure in the anticipated change in status of any sensing device, or process including the sensor of an alarm system or other event. The system enables automated simultaneous contact of one or more persons over a plurality of telephonic and electronic communication channels and provides parallel event-specific notification via voice, pages, voice mail, fax and email to the recipient(s) that are identified by electronic or speech recognized entry of a PIN and then provides them with a detailed message including the date and time of a specific event which has occurred with respect to a monitored sensor. A telephone switching or conferencing feature allows the recipient(s) to communicate directly with a predetermined or pre-programmed location or person or select from a menu based upon the type of event that has occurred and the pre-programmed selection list. The system may be custom programmed by the authorized subscriber via a telephone interactive voice response system or Internet web page that offers specific programming, reporting, contact numbers, and message options. The system may also be triggered or programmed to perform its notification based upon the input of a timer, pre-programmed to operate at a specific time, upon failure of an input, trigger or event to happen, or triggered by another CPU.

DESCRIPTION OF THE PREFERRED EMBODIMENT

In the following discussion, it should be understood that the automated parallel and redundant subscriber contact and notification system may be used on connection with any type of passive or active sensor, event sensing device, vehicle or premises alarm system, or signal generating device, and may also receive a signal generated by another CPU of a computer to activate the notification system.

Figure 1:
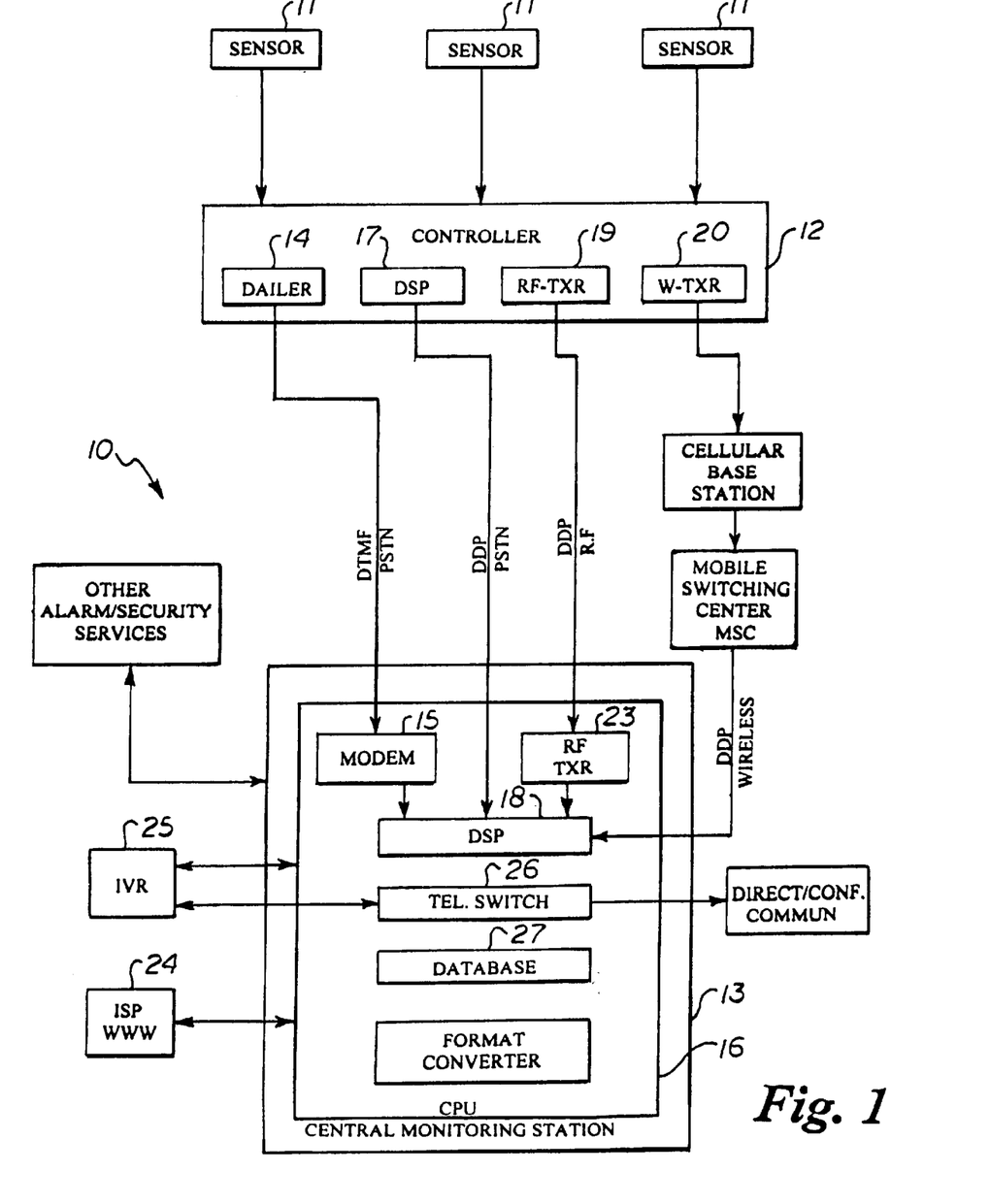
FIG. 1 is a schematic diagram of the automated parallel and redundant subscriber contact and notification system in accordance with the present invention.

Referring to the drawings by numerals of reference, there is shown in FIG. 1, the major components of a preferred automated parallel and redundant subscriber contact and notification system 10. One or more sensors 11 disposed on a premises, vehicle, or articles to be monitored are connected with a controller 12 which detects a change in status or senses an event at the sensor location. As discussed above, the controller 12 may be connected with any type of sensor or event sensing device or signal generating device, and the controller may be integrated with or connected with a plurality of different sensors or monitored devices for simultaneously monitoring a plurality of different events.

The controller 12 communicates with a central monitoring station 13 through several alternate communications channels, including a publicly switched telephone network (PSTN), a direct wired connection, a wireless or cellular communications network, and a radio frequency RF channel. The controller 12 may include a phone dialer 14, also known as an auto-dialer, which dials the number of the central monitoring station 13 and transmits DTMF "touchtone" phone signals to a receiving modem 15 or a digital signal processor DSP connected with a central processing unit CPU 16 at the central monitoring station 13 through the publicly switched telephone network (PSTN). In this case, the transmitted DTMF signal is converted into an intelligent digital data packet DDP (described hereinafter) at the central monitoring station 13. The controller 12 at the monitored site may also include a digital signal processor DSP 17 that formats the sensor signal into an intelligent digital data packet DDP and dials the number of the central monitoring station and transmits the digital data packet DDP through the publicly switched telephone network (PSTN) to a receiving digital signal processor DSP 18 connected with the CPU at the central monitoring station.

The controller 12 may include a wireless transceiver 19 for transmitting the digital data packet DDP via the cellular communications network, and/or a radio frequency RF transceiver 20 that transmits the digital data packet DDP via a RF communications channel. In the wireless or cellular communications network the transceiver 19 at the controller 12 sends the cellular DDP to a cellular base station 21 and from there it is transmitted to a mobile switching center (MSC) 22. The MSC 22, depending upon the mobile identification number (MIN) of the notification service, routes the signal to the CPU 16 of the notification service monitoring station. In the radio frequency communication channel, the RF transceiver 20 at the controller 12 communicates with an RF transceiver 23 connected with the CPU 16 at the central monitoring station over any conventional wireless radio communication frequency.

The controller 12 is programmed to format the sensor signal into DTMF or DDP and select the appropriate communications network or channel on which to transmit, depending upon which communications channel is installed or chosen and which sensor and the type of sensor that is triggered. The digital data packet DDP, whether transmitted or converted at the receiving end, is formatted or coded to contain account, sensor and event-specific messaging indicators that represent which specific sensor was triggered, the type of event that triggered the sensor, and the subscriber account number, which is the record key for the corresponding subscriber database record.

The CPU 16 at the central monitoring station is connected with an Internet service provider (ISP) 24 and has an interactive website and to a telephone interactive voice response device (IVR) 25 whereby the subscriber to the notification service can custom program specific sensors to be monitored, the type of event that would trigger the sensor, and instructions as to responding to the event, and various other options, as discussed below.

The CPU 16 at the central monitoring station is also connected with a telephone switching or conferencing device 26 and programmed to electronically connect a notified authorized subscriber to one or more predetermined or pre-programmed telephone numbers for direct communication with the selected number based upon the particular type of event which has occurred after being notified. The CPU 16 has a monitor, operating software for carrying out the operations, and a database 27 containing all of the stored and retrievable sensor data, subscriber data, phone lists, and instructional data.

Figure 2:
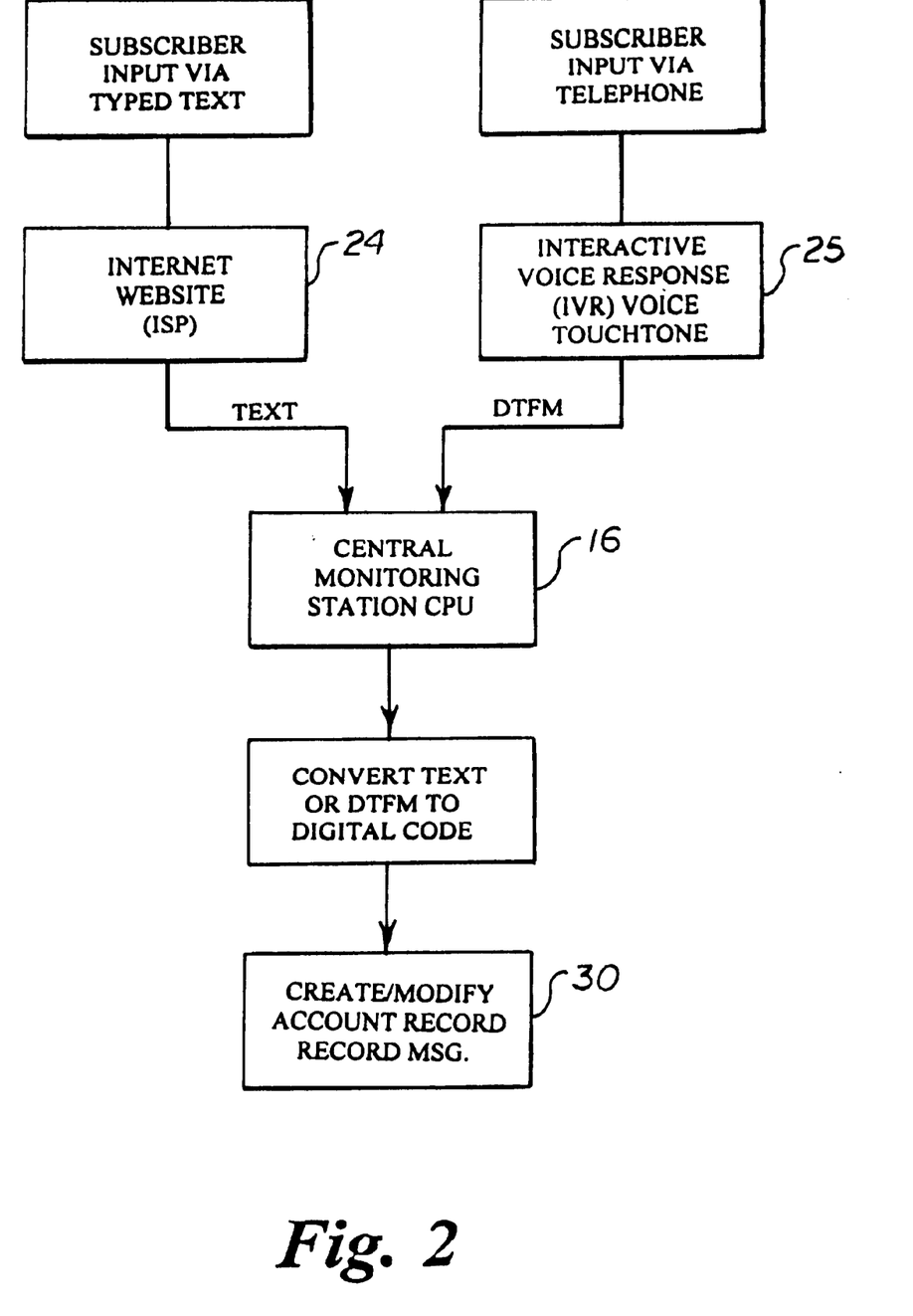
FIG. 2 is a block diagram depicting the input of information into the central monitoring station subscriber account record via Internet or by telephone.

Referring now to FIG. 2, the notification service sets up a subscriber account record and the subscriber is assigned a unique account number and a personal identification number (PIN), which may be maintained by the subscriber, after which the sensor and subscriber information is entered. This information may be entered by personnel at the notification service or by the subscriber directly through the Internet website 24 typing the information in text form or by voice menus through the telephone interactive voice response system (IVR) 25 by pressing DTMF touchtone keypads of the telephone in response to selective options presented.

In addition to the name, address, and other personal information, the subscriber selects and enters information regarding the number of persons to be notified, the specific sensors to be monitored, the type of event that would trigger each specific sensor, a list of telephone numbers and the notification channels to be notified in relation to the particular event including telephone numbers, mobile telephones numbers, pages numbers, fax numbers, voice mail numbers, and email address for all of the authorities or contact persons authorized to receive the event-specific message to be delivered, in what formats the message is to be delivered, and the action steps to be taken upon the sensing of an event or following notification, and the hours of operation. Each specific event triggered by a sensor and each type of event is assigned a respective identifier number. The event may be correlated to the location of a particular type of sensor (ie fire, motion, door opening, etc.) so that the type of event is known when that sensor location is indicated. The text or DTMF touchtone data entered by the subscriber and/or the notification service is converted by the software to digital data and stored in the database in a specific subscriber account record.

For example, sensor #11 may be a fire alarm or smoke detector, water sensor, motion detector, etc. located in the storage room of a building, and the subscriber may enter one or more telephone numbers and authorized contact persons to be called and contacted system-wide or in response to that particular sensor. A different set of telephone numbers and contact persons may be entered for each different sensor or location or event. For example, the subscriber may instruct the system to automatically call the phone number of the guard at the front gate of the building and on his cell phone and deliver the message that "the fire sensor in the storage room of the building has been activated" or, if the sensor monitoring the front door of a building has been activated, to call the number of the private security company and deliver the message the "the front door on the building at 123 Elm Street has been opened". The subscriber may also instruct the system to simultaneously notify them at the subscriber's work number, home number, cell phone number, pages number, and to send a fax, and/or email message, upon the occurrence of a particular event. The subscriber may update or modify his account record via the Internet or via the interactive voice response telephone program (IVR). Thus, if the subscriber travels, is at a different location, or desires to be notified in some other manner, he or she can easily view and change or supplement their contact information on the central monitoring station's secure website in real-time from any location in the world.

Figure 3:
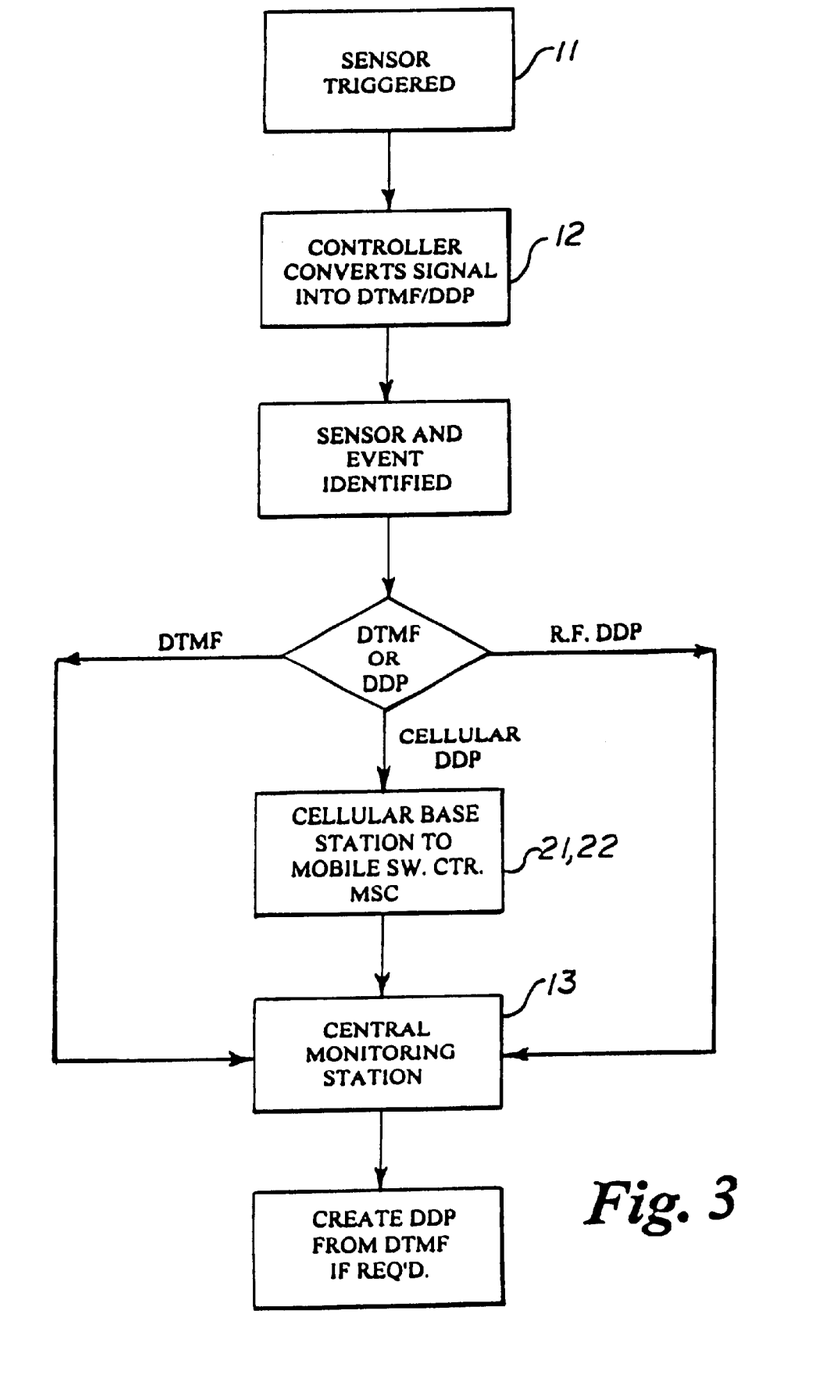
FIG. 3 is a schematic flow diagram depicting the method of processing a signal generated by a remote sensor and transmitting it to the central monitoring station.

Referring now to FIG. 3, when the controller 12 is triggered by a sensor 11, the controller determines which sensor and/or type of sensor was activated, the type of event causing activation, and determines whether to format the sensor signal into a DTMF signal or digital data packet DDP and selects the appropriate communications network or channel on which to transmit. The DTMF signal or digital data packet DDP, whether transmitted or converted at the receiving end, also contains indicators that represent the subscriber account number, which is the record key for the corresponding subscriber database record.

Figure 4:
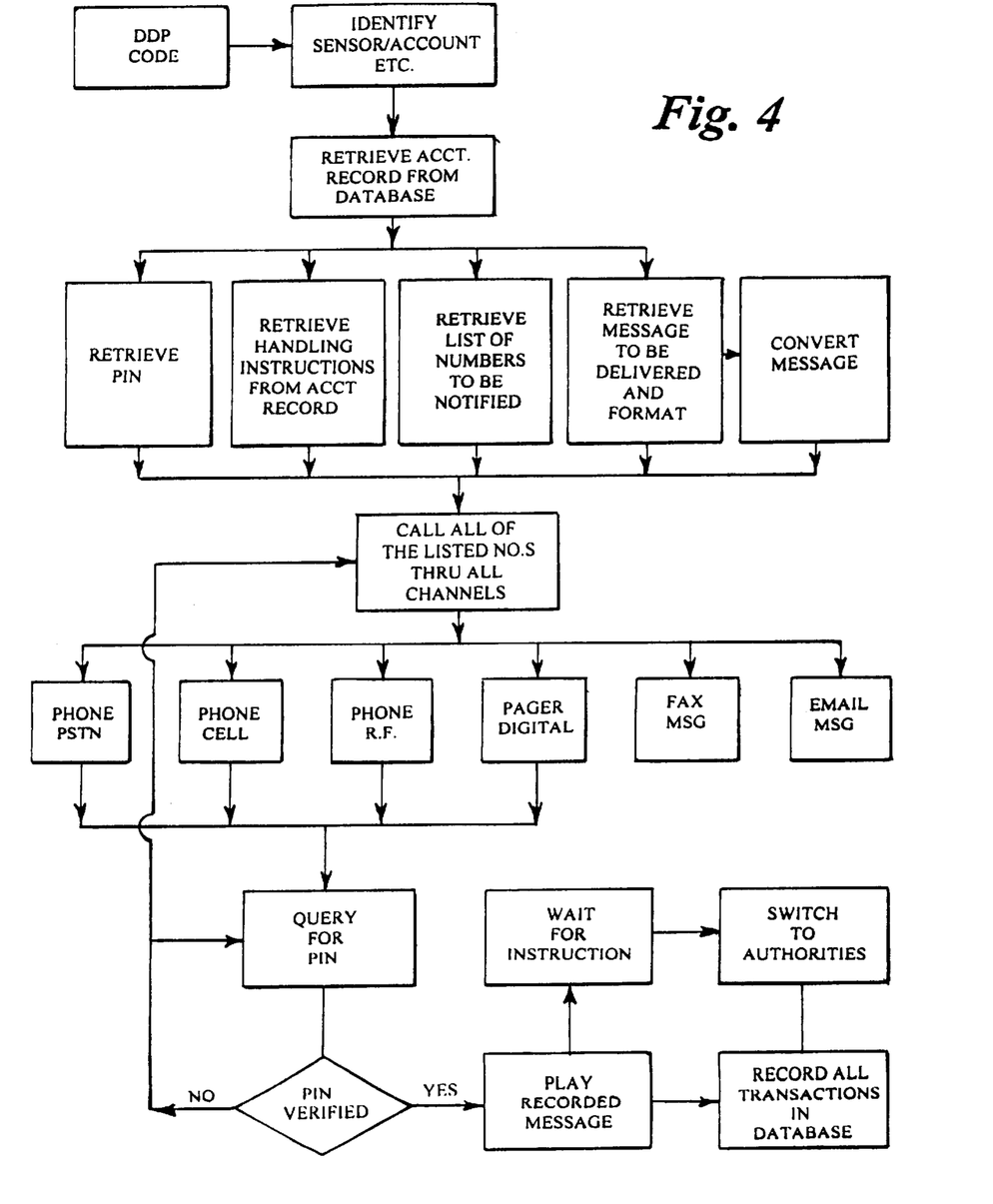
FIG. 4 is a schematic flow diagram depicting the method of processing the received signal at the central monitoring station and the call notification process relative thereto.

Referring now to FIG. 4, when the incoming signal is received or converted to the digital data packet DDP, the software program-on the CPU at the central monitoring station retrieves the record of the subscriber account that the sensor belongs to, and extracts certain key information including: (a) the name, address, and all of the personalized identification information of that account holder; (b) the group of telephone numbers and contact persons to be called in response to the particular sensor location or event that triggered a particular sensor, and (c) the particular message to be delivered to the contact person(s).

The software program on the CPU at the central monitoring station also simultaneously formats a text fax and email message, and a digital pages message of the pre-programmed message to be delivered to a fax phone number and email address pre-programmed by the subscriber in response to the particular zone or the event that occurred at that sensor location.

The digital signal processor DSP, or dialer, or telephone switching device connected with the central monitoring station CPU then starts making the simultaneous and parallel telephone calls that correspond to the group of telephone numbers and contact persons pre-programmed for that particular sensor and event. Upon one of the dialed numbers being answered, the software program plays a recorded voice or synthesized voice message to identify itself, for example: "This is the alarm network notification system, we have an important security notification, please enter your PIN number now", and waits for a response of DTMF tones or speech corresponding to the pin number. The program then compares the entered PIN number with the one on the record retrieved from the database. If the PIN number does not match, the request message is repeated a predetermined number of times, after which it will terminate that particular call (hang up the phone) if the proper PIN is not entered in the number of attempts allowed. Meanwhile parallel calls are also being made simultaneously to all of the other pre-programmed persons and numbers through the various communications channels to request a valid PIN number. The text fax, and email messages, and the digital pages message are automatically delivered to the pre-programmed phone numbers and email addresses. The digital pages message comprises the telephone number to the CPU's digital signal processor (DSP) interactive voice response (IVR) system including a unique event code such as a serial number corresponding to the specific event that occurred. The subscriber upon receipt of the page calls the paged telephone number and enters, via the telephone keypad, the unique event serial number prompting the IVR system to then perform the automated notification process.

If the entered PIN does match, the digital signal processor DSP through a voice synthesizer gives the date and time and plays the pre-programmed sensor and event message to the authorized person. The subscriber or authorized person is also given the option of being connected through the telephone switching or conferencing device connected with the CPU at the central monitoring station in direct voice communication with a pre-programmed contact number or to select from a list by pressing a key on the phone keypad, such as: 911, ambulance service, fire department, customer service, etc., to allow the notified subscriber to speak directly with the appropriate authorities personnel to get immediate assistance and give information. The CPU may optionally be programmed to connect the subscriber in direct voice communication with only one contact number corresponding to the specific event, in which case the message would state, for example: "Please wait while I connect you with the fire department".

The system may optionally be triggered or programmed to perform its notification based upon the failure to receive an anticipated input, input of a timer or pre-programmed to operate at a specific time, or repeat the calling operation at timed intervals in the event none of the calls are answered. The system may also be to be programmed to contact a subscriber through an incoming call via the telephone interactive voice response system to allow someone to notify a particular subscriber of an emergency event.

At the completion of a notification session, a historical record is made of the complete event and notification transaction, including the date, time, all numbers called and answered, calls that were transferred, and names of entities contacted. The historical record is preserved and accessible to authorized persons.

One of the major benefits of the present pre-programmed and automated parallel and redundant contact and notification system and method is that it provides expeditious and efficient handling of time sensitive events and significantly reduces response time in emergency situations.

The parallel and redundant calling of plural numbers and contact and notification over plural communication channels insures that the subscriber or an authorized person will be contacted quickly even in the event one of the communications channels may be rendered inoperative or any one of a subscriber contact persons be unavailable. For example if the publicly switched telephone network (PSTN) communications line is severed or out of order due to tampering, a severe storm, or a changed number, etc.

A plurality of conventional alarm and security companies may be connected in communication with the central monitoring station so that present pre-programmed and automated parallel and redundant contact and notification service can be used to more efficiently locate and contact and their clients and thereafter place the client in direct communication with the alarm or security company for subsequent action. Such an arrangement provides reduced traffic at the alarm or security stations and allows them to enhance and improve their services without incurring additional labor costs.

The digital data packet DDP and wireless or Internet communication network also enables the present system to provide video and/or audio transmissions from the monitored device or premises to the central monitoring station due to the bandwidth capabilities of most digital data packet networks.

While this invention has been described fully and completely with special emphasis upon preferred embodiments, it should be understood that within the scope of the appended claims the invention may be practiced otherwise than as specifically described herein.

What is claimed is:

1. A method for automated parallel and redundant subscriber contact and event notification, comprising the steps of:

providing a central processing unit having a database of subscriber records encoded with data representing the identity of a subscriber or authorized representative, the identity of remote event sensors associated with the subscriber, identity of the location of each respective subscriber event sensor, identity of trigger events that trigger each respective sensor, and a list of telephone numbers to be called, and communication channels to be notified electronically upon the occurrence of each specific trigger event;

receiving and decoding an encoded event signal from a triggered event sensor, extracting data from said received event signal representing the identity and location of said triggered sensor, the identity of the triggering event, and the identity of the subscriber associated with the triggered event sensor;

retrieving from said database, in response to said received event signal, the subscriber record corresponding to said triggered event sensor, and the list of telephone numbers and communication channels to be called or notified electronically corresponding to the specific trigger event;

formatting an event-specific message containing information and data received from said triggered sensor; and placing a telephone call and initiating communication simultaneously to all of the telephone numbers and communication channels on said list corresponding to the specific trigger event, and, upon a call being answered or communication established through a communication channel, delivering said event-specific message.

2. The method according to claim 1, wherein said step of formatting an event-specific message comprises formatting said event-specific message to containing information and data selected from the group consisting of the date, time, identity and location of said triggered sensor, and specific information gathered of the triggering event.

3. The method according to claim 1, comprising the additional step of:

telephonically connecting an authorized subscriber or representative in direct communication with a predetermined or selected telephone number.

4. The method according to claim 1, wherein said step of receiving and decoding comprises selectively receiving and decoding encoded signals selected from the group consisting of DTMF signals, digital data packet DDP signals, wireline signals, wireless data signals, wireless cellular signals, wireless control channel signals, alarm signals, alarm central monitoring station signals, and radio frequency RF signals.

5. The method according to claim 1, wherein said step of placing a call and initiating communication simultaneously comprises placing said call and initiating communication over communications channels selected from the group consisting of publicly switched telephone network (PSTN), a direct wired connection, wireless communications network, cellular communications network, alarm central monitoring station connection, paging network, Internet network connection, email network connection, intranet connection, radio frequency RF channels and networks, and electronic messaging systems.

6. The method according to claim 1, wherein said step of formatting said message comprises formatting said message into formats selected from the group consisting of DTMF tones, voice, text, fax, pages, email, alarm signals, electronic, and digital.

7. The method according to claim 1, wherein said step of providing a database of subscriber records includes providing at least one fax number or email address of a contact entity to be notified upon the occurrence of each specific trigger event; and said step of formatting said message comprises formatting said message into a digital format capable of being displayed and printed as a text message upon being received.

8. The method according to claim 1, comprising the additional steps of:

allowing said subscriber records to be selectively created, retrieved, viewed, edited and updated.

9. The method according to claim 8, including the additional steps of:

allowing said messages to be delivered, the format in which said messages are to be received, the desired communication channels, and message options to be selectively created, retrieved, viewed, edited, updated and recorded, and the commands, responses, and actions which the system will take to be programmed and scheduled.

10. The method according to claim 9, wherein said steps of selectively creating, retrieving, viewing, editing, recording and updating programming and scheduling is carried out via an interactive interface device selected from the group consisting of an Internet interface connection, another computer, an alarm central station interface, a telephone interactive voice response device (IVR), speech recognition device, and text-to-speech device.

11. The method according to claim 10, wherein said authorized subscriber selectively enters information via an Internet website by typing the information in text form.

12. The method according to claim 10, wherein said interactive voice response device presents an audible menu of system commands and options and said authorized subscriber selectively enters information responsive thereto via voice response or by pressing DTMF touchtone keypads of the telephone being used.

13. The method according to claim 1, wherein said calls are placed and electronic messages are initiated based upon the input of a timer, a preprogrammed schedule, or upon failure to receive a signal from an event sensor.

14. The method according to claim 1, comprising the further steps of:

connecting said central processing unit in communication with a network of remote alarm central stations or security service companies having subscriber security systems whereby said automated parallel and redundant subscriber contact and event notification system selectively locates, contacts, delivers subscriber messages, and/or places them in direct communication with the respective alarm central station or security service company for subsequent action.

15. The method according to claim 1, comprising the further step of:

connecting said central processing unit in communication with a network of remote alarm central stations or security service companies having subscriber security systems whereby said automated parallel and redundant subscriber contact and event notification system supplements, backs up, or replaces the system of the alarm central station or security service company.

16. The method according to claim 1, comprising the further step of:

recording and storing a complete retrievable historical record of each command, trigger, event, and related message and notification transactions.

17. A method for automated parallel and redundant notification of multiple recipients by delivery of a message relative to a specific event triggered by at least one monitored event sensor, comprising the steps of:

providing a database of recipients and sensor records with data representing the identity of recipients to be notified, the identity of event sensors associated with the recipients, the identity of the trigger event that is received from each respective triggered sensor, a corresponding programmed event specific message to be delivered to each of the message recipients, and a list of telephone numbers and communication channels to be called or notified electronically upon the occurrence of each specific trigger event;

providing at least one event sensor at a location, said sensor generating an encoded event signal responsive to a triggering event or absence thereof encoded to contain data identifying the triggered sensor and the specific event that triggered the sensor;

receiving the encoded event signal;

retrieving the records associated with the identified triggered sensor and the corresponding event specific message to be delivered;

formatting the corresponding event specific into an electronic message format selected from the group consisting of DTMF tones, voice, text, fax, email, pages, alarm signals, electronic and digital; and initiating delivery of the programmed event specific electronic message over communications channels selected from the group consisting of publicly switched telephone network (PSTN), a direct wired connection, wireless communications network, cellular communications network, alarm central monitoring station connection, a paging network, Internet network connection, email network connection, intranet connection, radio frequency RF channels and networks, and electronic messaging systems.

18. An automated parallel and redundant subscriber contact and event notification system, comprising:

at least one central processing unit including a memory storage means containing a database of subscriber and sensor records with data representing the identity of a subscriber or representative, identity of remote event sensors associated with the subscriber, identity of the location of each respective subscriber event sensor, identity of the trigger events that are received from each respective triggered sensor, and a list of telephone numbers and communication channels to be called or notified electronically upon the occurrence of each specific trigger event;

a signal receiving and decoding means connected with said central processing unit for receiving an encoded event signal from a triggered event sensor, extracting data from said received event signal representing the identity and location of said triggered sensor, the identity of the triggering event, and the identity of the subscriber or representative associated with the triggered event sensor;

record processing means associated with said central processing unit for retrieving from said database in response to said received event signal, the subscriber record corresponding to said triggered event sensor, and the list of telephone numbers and communication channels to be called or notified electronically corresponding to the specific trigger event;

message formatting means connected with said central processing unit for formatting an event-specific message containing information and data received from said triggered sensor; and telephony processing and electronic communication means connected with said central processing unit for placing a call and initiating electronic messages simultaneously to all of the telephone numbers and communications channels on said list corresponding to the specific trigger event, and, upon a call being answered or communication established through a communication channel, delivering said event-specific message.

19. The system according to claim 18, further comprising:

input means connected with said central processing unit for receiving input whereby the subscriber records may be created, recorded, retrieved, viewed, edited and/or updated.

20. The system according to claim 19, wherein said input means connected with said central processing unit allows input from an authorized subscriber whereby the authorized subscriber may create, record, retrieve, view, edit and/or update his particular subscriber record.

21. The system according to claim 19, wherein said input means comprises means for receiving input whereby the messages to be delivered, the format in which said messages are to be received, the desired communications channels, and message options may be selectively created, edited, recorded, or chosen, and wherein commands, responses, and actions which the system will take may be programmed and scheduled.

22. The system according to claim 19, wherein said input means comprises means for receiving input from an authorized subscriber whereby the authorized subscriber may selectively create, record and edit messages to be delivered, designate the format in which said messages are to be received, the desired communications channels, message options, and program and schedule commands, responses, and actions which the system will take.

23. The system according to claim 19, wherein said input means comprises an interactive interface device selected from the group consisting of an Internet interface connection, another computer, an alarm central station interface, a telephone interactive voice response device (IVR), speech recognition device and text-to-speech device.

24. The system according to claim 18, further comprising:

a network of remote alarm central stations or security service companies having subscriber security systems connected via a network connection in communication with said central processing unit whereby said automated parallel and redundant subscriber contact and event notification system selectively locates, contacts, delivers subscriber messages, and/or places them in direct communication with the respective alarm central station or security service company for subsequent action.

25. The system according to claim 18, further comprising:

a network of alarm central stations or security service companies having subscriber security systems connected via a network connection in communication with said central processing unit whereby said automated parallel and redundant subscriber contact and event notification system supplements, backs up, or replaces the system of the alarm central station or security service company.

26. The system according to claim 18, wherein said message formatting means formats said event-specific message to contain information and data selected from the group consisting of the identity, date, time and location of said triggered sensor and specific information gathered of the triggering event.

27. The system according to claim 18, further comprising:

telephone switching and conferencing means connected with said central processing unit and said telephony processing and communication means for connecting an authorized subscriber or call recipient, in direct communication with a predetermined or selected telephone number.

28. The system according to claim 18, wherein said signal receiving and decoding means comprises means for receiving and decoding encoded signals selected from the group consisting of DTMF signals, digital data packet DDP signals, wireless data signals, wireless cellular signals, wireless control channel signals, alarm signals, alarm central monitoring station signals, radio frequency RF signals, and wireline signals.

29. The system according to claim 28, wherein said signal receiving and decoding means comprises a signal receiving and processing device selected from the group consisting of a modem, a communication channel network interface card, digital signal processor DSP, a wireless transceiver, a wireline device, an alarm central monitoring station receiver or system, and a radio frequency RF transceiver.

30. The system according to claim 18, wherein said telephony processing and communication means comprises means for placing a call and initiating electronic messages simultaneously over communications channels selected from the group consisting of publicly switched telephone network (PSTN), a direct wired connection, wireless communications network, cellular communications network, alarm central monitoring station connection, a paging network, Internet network connection, email network connection, intranet connection, radio frequency RF channels and networks, and electronic messaging systems.

31. The system according to claim 30, wherein said telephony processing and electronic communication means connected with said central processing unit are configured to place a call and initiate electronic messages based upon the input of a timer, a preprogrammed schedule, or upon failure to receive a signal from an event sensor.

32. The system according to claim 18, wherein said message formatting means includes means for selectively formatting said message into formats selected from the group consisting of DTMF tones, voice, text, fax, email, pages, alarm signals, electronic and digital.

33. The system according to claim 18, wherein said database of subscriber records includes at least one fax number or email address of a contact entity to be notified upon the occurrence of each specific trigger event; and said message formatting means comprises means for formatting said message into a digital format capable of being displayed and printed as a text message upon being received.

34. The system according to claim 18, wherein said record processing means records and stores a complete retrievable historical record of each command, trigger, event, and related message and notification transactions.

* * * * *